(12) United States Patent
Helm et al.

(10) Patent No.: US 11,396,239 B2
(45) Date of Patent: Jul. 26, 2022

(54) COIL DEVICE FOR A MOTOR VEHICLE, IN PARTICULAR FOR AN AUTOMOBILE

(71) Applicant: Bayerische Motoren Werke Aktiengesellschaft, Munich (DE)

(72) Inventors: Detlef Helm, Mauth (DE); Josef Krammer, Holzkirchen (DE); Tobias Mueller, Landau (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 398 days.

(21) Appl. No.: 16/674,673

(22) Filed: Nov. 5, 2019

(65) Prior Publication Data

US 2020/0062137 A1 Feb. 27, 2020

Related U.S. Application Data

(63) Continuation of application No. PCT/EP2018/067353, filed on Jun. 28, 2018.

(30) Foreign Application Priority Data

Jun. 30, 2017 (DE) ...................... 10 2017 211 211.5

(51) Int. Cl.
*H02J 50/10* (2016.01)
*B60L 53/12* (2019.01)
(Continued)

(52) U.S. Cl.
CPC ................ *B60L 53/12* (2019.02); *H01F 3/08* (2013.01); *H01F 27/263* (2013.01); *H01F 38/14* (2013.01); *H02J 50/10* (2016.02)

(58) Field of Classification Search
USPC ........................................................ 320/108
See application file for complete search history.

(56) References Cited

U.S. PATENT DOCUMENTS 5,576,514 A * 11/1996 Fujimoto ............. H01B 7/0063
338/214
2011/0315399 A1* 12/2011 Rodney ................... E21B 47/12
166/242.6
(Continued)

FOREIGN PATENT DOCUMENTS

DE 10 2012 202 472 A1 8/2013
DE 20 2012 101 402 U1 9/2013
(Continued)

OTHER PUBLICATIONS

International Search Report (PCT/ISA/210) issued in PCT Application No. PCT/EP2018/067353 dated Sep. 20, 2018 with English translation (four (4) pages).
(Continued)

*Primary Examiner* — Bryce M Aisaka
(74) *Attorney, Agent, or Firm* — Crowell & Moring LLP

(57) ABSTRACT

A coil device for a motor vehicle has a housing which has a receiving area, at least one secondary coil which is arranged in the receiving area for inductively transmitting electric energy in order to charge an energy storage unit of the motor vehicle, and at least one ferrite element which is arranged in the housing for conducting at least one magnetic field in order to inductively transmit the electric energy. The ferrite element has at least two ferrite regions that are at least partly mutually spaced by at least one through-opening which is arranged between the ferrite regions and in which a support structure is at least partly arranged and that is made of a fiber composite material and has ferrite elements received in the fiber composite material, wherein opposing housing elements of the housing are supported against each other via said support structure.

10 Claims, 2 Drawing Sheets

(51) Int. Cl.
  *H01F 3/08* (2006.01)
  *H01F 27/26* (2006.01)
  *H01F 38/14* (2006.01)

(56) References Cited

U.S. PATENT DOCUMENTS

2016/0297306 A1  10/2016  Herzog et al.
2018/0114636 A1   4/2018  Keil et al.

FOREIGN PATENT DOCUMENTS

| DE | 10 2013 226 830 A1 | 6/2015 |
| DE | 10 2015 213 096 A1 | 1/2017 |
| DE | 10 2015 218 317 A1 | 3/2017 |
| DE | 10 2016 220 898 A1 | 4/2017 |
| JP | 1-198002 A | 8/1989 |

OTHER PUBLICATIONS

German-language Written Opinion (PCT/ISA/237) issued in PCT Application No. PCT/EP2018/067353 dated Sep. 20, 2018 (five (5) pages).
German-language Office Action issued in counterpart German Application No. 10 2017 211 211.5 dated Apr. 27, 2018 (nine (9) pages).
"Ferrite", Wikipedia, Nov. 4, 2019, https://de.wikipedia.org/wiki/Ferrite, with English Translation (14 pages).

* cited by examiner

COIL DEVICE FOR A MOTOR VEHICLE, IN PARTICULAR FOR AN AUTOMOBILE

CROSS REFERENCE TO RELATED APPLICATIONS

This application is a continuation of PCT International Application No. PCT/EP2018/067353, filed Jun. 28, 2018, which claims priority under 35 U.S.C. § 119 from German Patent Application No. 10 2017 211 211.5, filed Jun. 30, 2017, the entire disclosures of which are herein expressly incorporated by reference.

BACKGROUND AND SUMMARY OF THE INVENTION

The invention relates to a coil device for a motor vehicle, in particular for an automobile, having a housing which has a receiving space, at least one secondary coil which is arranged in the receiving space for inductive transmission of electric energy for charging an energy store of the motor vehicle, and at least one ferrite element which is arranged in the housing for conducting at least one magnetic field for the inductive transmission of the electric energy.

A coil device of this type for a motor vehicle, in particular for an automobile, is already known, for example, from DE 10 2013 226 830 A1. The coil device has a housing with a receiving space, and at least one secondary coil which is arranged in the receiving space for the inductive transmission of electric energy for charging an energy store of the motor vehicle. To this end, the secondary coil can interact inductively with a primary coil, by electric energy being transmitted inductively from the primary coil to the secondary coil. Furthermore, the coil device comprises at least one ferrite element which is arranged in the housing for conducting, in particular shielding, at least one magnetic field for the inductive transmission of the electric energy. In other words, at least one magnetic field is generated, in order to transmit the electric energy inductively from the primary coil to the secondary coil. Here, the ferrite element is utilized, in order to conduct, in particular to shield, the magnetic field.

Moreover, DE 10 2015 213 096 A1 discloses a coil unit for the inductive transmission of energy, the coil unit comprising at least one coil winding and a ferrite core. It is provided here that the at least one coil winding and the ferrite core are surrounded by a structure made from a fiber reinforced plastic.

It is an object of the present invention to provide a coil device of the type mentioned at the outset, with the result that a particularly high robustness of the coil device can be realized.

This and other objects are achieved by way of a coil device according to the claimed invention.

In order to provide a coil device of the type mentioned at the outset, with the result that the coil device has a particularly high robustness, it is provided according to the invention that the ferrite element has at least two ferrite regions which are spaced apart from one another at least partially via at least one through opening which is arranged between the ferrite regions. In other words, the ferrite element has the through opening which is arranged at least between respective part regions of the ferrite regions. As a result, the ferrite regions are spaced apart from one another at least in the region of the through opening. In other words, a spacing is formed between the ferrite regions by way of the through opening.

Here, the coil device comprises at least one supporting structure which is arranged at least partially at said spacing or in the through opening, the supporting structure penetrating the through opening, for example, in particular completely. Opposite housing elements of the housing are supported on one another via the supporting structure. This means that, for example, a first one of the housing elements is arranged on a first side of the ferrite element, a second one of the housing elements being arranged on a second side of the ferrite element, which second side faces away from the first side. Here, for example, the supporting structure can extend through the through opening from one of the sides to the other side, with the result that the housing elements are supported on one another via the supporting structure. By way of said support of the housing elements, for example, forces which act on one of the housing elements can be absorbed by way of the one housing element and, in particular bypassing the ferrite element, can be transmitted via the supporting structure to the respective other housing element, without excessive actions of force which result from said forces occurring on the ferrite element or the ferrite regions. As a result, the ferrite element is protected reliably against excessive, in particular external, actions of force.

The ferrite element and therefore the ferrite regions are formed from ferrite, with the result that the ferrite element and the ferrite regions are usually brittle and very hard. Therefore, the ferrite element per se is at risk of fracture, in particular if a tensile and/or flexural load occurs. The ferrite element is utilized to conduct, in particular to shield, the magnetic field. If the ferrite element fractures and/or the ferrite element is damaged or destroyed in some other way, the desired function of the ferrite element with regard to the conducting or shielding of the magnetic field is impaired negatively as a result, as a result of which an efficient inductive transmission of energy is also impaired.

Since the housing elements can then absorb and distribute forces which act from the outside on the housing in the described way in a particularly advantageous manner, without excessive loading of the ferrite element occurring, the probability that damage, in particular a fracture, of the ferrite element occurs can be kept particularly low. An external action of force of this type which acts on the housing or the housing elements occurs, for example, when an object which is initially arranged on a roadway, along which the motor vehicle is being driven, impacts against the housing and therefore against one of the housing elements. Furthermore, for example, other components which are arranged in the receiving space, such as power electronics and/or the secondary coil, can also be protected by means of the supporting structure against excessive actions of force. Since the supporting structure is received in the receiving space, the supporting structure is integrated into the housing, with the result that the installation space requirement of the coil device can be kept particularly low. Furthermore, it is possible by way of the integrated supporting structure, for example, to utilize installation space which is present in any case for supporting the housing elements, with the result that the installation space requirement, the number of parts and the weight of the coil device can be kept within a particularly low range.

Here, the supporting structure is formed from the fiber composite material which is preferably electrically non-conductive and magnetically permeable. The fiber composite material comprises reinforcement fibers and a matrix, into which the reinforcement fibers are embedded. Here, the matrix is preferably formed from a plastic. For example, glass fibers, basalt fibers, aramid fibers, carbon fibers and/or other fibers can be used as the reinforcement fibers.

In a further refinement of the invention, the receiving space is delimited at least partially, in particular at least predominantly or completely, in the vehicle vertical direction toward the top by way of a first one of the housing elements and in the vehicle vertical direction toward the bottom by way of a second one of the housing elements. The first housing element is therefore, for example, a cover or cover element, the second housing element being, for example, a bottom of the housing. This embodiment is based on the finding that forces can act from the outside, in particular, on the floor or the second housing element, which forces result from the fact that objects impact against the housing from the outside. Forces can be absorbed and distributed particularly advantageously by way of the supporting structure, as a result of which a particularly high robustness can be provided.

In a further refinement of the invention, the housing is covered in the vehicle vertical direction toward the top at least partially, in particular at least predominantly or completely, by way of a further component of the motor vehicle.

It has been shown to be particularly advantageous here if the housing is supported directly on the further component in the vehicle vertical direction toward the top, in order to provide a support which is stable and favorable in terms of installation space.

A further refinement provides that an air gap is provided in the vehicle vertical direction between the housing and the further component. Therefore, for example in the case of an action of force which acts on the housing, in particular in the vehicle vertical direction from the bottom to the top, the housing is displaced upward, for example, as a rigid body until the housing or the rigid body comes into contact with the component which is arranged above it. As a consequence, the action of force can be supported particularly advantageously on the component.

In order for it to be possible for the number of parts and therefore the costs to be kept particularly low, it is provided in a further refinement of the invention that the ferrite regions are configured in one piece with one another. The through opening is therefore a through-hole which penetrates the single-piece ferrite regions and is therefore delimited, for example, in its circumferential direction in a completely circumferential manner by way of the respective ferrite regions.

A further embodiment is distinguished by the fact that the ferrite regions are formed by way of ferrite parts of the ferrite element which are configured separately from one another, with the result that, for example, the ferrite element is assembled from the ferrite parts.

In a further refinement of the invention, the respective ferritic elements are formed from powder which is embedded in the fiber composite material, in particular its matrix.

As an alternative or in addition, the respective ferritic element has, for example, at least one foil.

The supporting structure which is also called a support structure is formed, for example, from a mixture comprising the magnetically permeable fiber composite material and ferrite, with the result that, for example, the supporting structure also has properties for conducting, in particular shielding, the magnetic field. As a result, the magnetic field can be conducted and/or shielded particularly advantageously even in the region of the through opening, to be precise, for example, by means of the supporting structure or by means of the ferritic elements.

In a further refinement of the invention, at least one spring device is provided, via which the supporting structure is supported on at least one of the housing elements. The spring device is formed, for example, by way of resilient elements which are deformed elastically, for example, in the case of an external action of force on the housing, and dissipate energy as a result. This can be realized in different ways depending on the application.

Furthermore, it is contemplated that the housing elements and the supporting structure are formed from the same material, in particular from the fiber composite material, with the result that, for example, the supporting structure or at least one part of the supporting structure is configured in one piece with the housing elements or with at least one of the housing elements.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
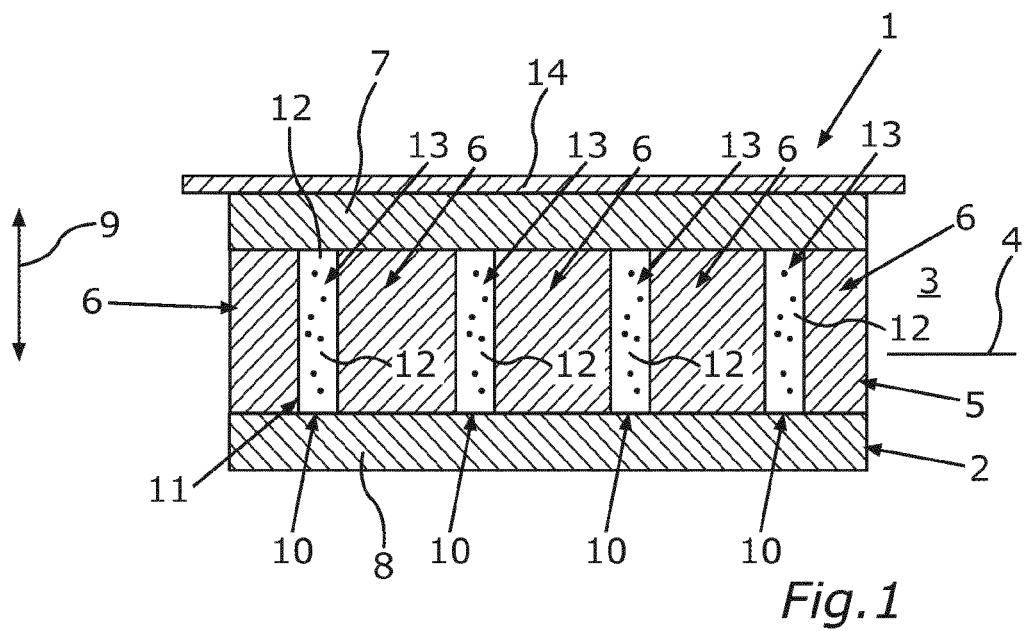
FIG. 1 shows details of a diagrammatic and sectioned side view of a coil device in accordance with a first embodiment for a motor vehicle, having a ferrite element with at least two ferrite regions, and having a supporting structure which is arranged at least partially in a through opening between the ferrite regions.

FIG. 1 shows a sectioned side view of details of a coil device 1 for a motor vehicle, in particular for a motor car such as a passenger car. The coil device 1 comprises a housing 2 with a receiving space 3. Furthermore, the coil device 1 comprises at least one secondary coil 4 which is shown in details and particularly diagrammatically in FIG. 1 and by means of which electric energy for charging an energy store of the motor vehicle can be transmitted inductively. The motor vehicle is configured, for example, as a hybrid or electric vehicle and has at least one electric machine, by which at least one wheel of the motor vehicle or the motor vehicle overall can be driven electrically. To this end, the electric machine can be operated in a motor mode and therefore as an electric motor. In order to operate the electric machine in the motor mode, the electric machine is supplied with electric energy which is stored in the energy store. As a result, a quantity of electric energy which is stored in the energy store decreases. In order to increase the quantity of electric energy which is stored in the energy store, the energy store which is configured, for example, as a battery, in particular as a high voltage battery (HV battery) is charged. For this purpose, for example, an energy source provides electric energy via a primary coil. The primary coil is arranged, for example, on a floor, on which the motor vehicle is supported via its wheels. For example, the floor is configured as a garage floor, car park floor or the like. The secondary coil 4 can interact inductively and therefore contactlessly with the primary coil in such a way that the electric energy which is provided by the energy source via the primary coil is transmitted inductively from the primary coil to the secondary coil. From the secondary coil, the electric energy can be conducted to the energy store and can be stored in the energy store, as a result of which the energy store is charged.

The coil device 1 is arranged, for example, in the region of an undertray or on an undertray of the motor vehicle, the undertray of which is formed, for example, by way of a floor of a body, in particular a self-supporting vehicle body, of the motor vehicle. For example, the coil device 1 is integrated into the undertray.

Furthermore, the coil device 1 comprises at least one ferrite element 5 which is arranged in the housing 2, in particular in the receiving space 3, for conducting, in particular shielding, at least one magnetic field for the inductive transmission of the electric energy. In other words, at least one magnetic field which can be conducted or shielded by means of the ferrite element 5 is generated for the inductive transmission of the electric energy.

It can be seen from FIG. 1 that the ferrite element 5 has ferrite regions 6 which can be configured in one piece with one another or can be formed by way of ferrite parts of the ferrite element 5 which are formed separately from one another.

Furthermore, the housing 2 has a first housing element 7 and an opposite, second housing element 8. Here, in relation to an installed position of the coil device 1, the receiving space 3 is delimited by way of the housing element 7 in the vehicle vertical direction toward the top at least partially, in particular at least predominantly or completely. In relation to the installed position, the receiving space 3 is delimited by way of the housing element 8 in the vehicle vertical direction toward the bottom at least partially, in particular at least predominantly or completely. The ferrite element 5 and the secondary coil 4 are arranged in the vehicle vertical direction between the housing elements 7 and 8, with the result that the housing element 7 is arranged on a first side of the ferrite element 5, which first side points upward in the vehicle vertical direction, and the housing element 8 is arranged on a second side of the ferrite element 5, which second side points downward in the vehicle vertical direction and lies opposite or faces away from the first side in the vehicle vertical direction. Here, the coil device 1 assumes its installed position in the completely produced state of the motor vehicle, the vehicle vertical direction being illustrated in FIG. 1 by way of a double arrow 9.

In order then to provide a particularly high robustness of the coil device 1 in a way which is favorable in terms of installation space and costs, the respective ferrite regions 6 of the ferrite element 5 are spaced apart from one another via respective through openings 10 which are arranged between the ferrite regions 6. The through openings 10 are therefore arranged between the respective ferrite regions 6. Moreover, a supporting structure 11 which is also called a support structure and is arranged at least partially in the through openings is arranged in the receiving space 3.

FIG. 1 shows a first embodiment, in the case of which the supporting structure 11 has a plurality of supporting elements 12. The supporting elements 12 are received in the respective through openings 11 at least partially, in particular at least predominantly or completely, and penetrate the through openings 10, in particular in the vehicle vertical direction. Here, the housing elements 7 and 8 which lie opposite one another are supported on one another via the supporting structure 11, in particular via the supporting elements 12, in particular in the vehicle vertical direction.

The supporting elements 12 can be configured in one piece with one another. As an alternative, it is contemplated that the supporting elements 12 are configured as components which are configured separately from one another.

The supporting structure 11 and therefore the supporting elements 12 are formed here from a fiber composite material and have ferritic elements which are embedded, for example, into the fiber composite material, in particular into its matrix. The fiber composite material comprises a plurality of reinforcement fibers and said matrix which is formed, for example, from a plastic and is therefore configured as a plastic matrix. Here, the reinforcement fibers are embedded into the matrix at least partially, in particular at least predominantly or completely. Furthermore, for example, the ferritic elements are embedded into the matrix, the ferritic elements being formed, for example, by way of a powder, that is to say by way of a ferrite powder, and/or having in each case at least one foil.

In the case of the first embodiment which is shown in FIG. 1, the ferritic elements are formed by way of a powder and are therefore configured as particles which are denoted by 13 in FIG. 1. Since the ferritic elements are embedded into the fiber composite material and this is arranged in the through openings 10, the ferritic elements are arranged in the through openings 10. The ferritic elements give the supporting structure 11 a capability with regard to the conducting, in particular shielding, of said magnetic field, with the result that the magnetic field can be conducted particularly advantageously even in the region of the through openings 10. As a result, the electric energy can be transmitted inductively in a particularly efficient manner. At the same time, a particularly high, in particular mechanical robustness can be realized, since forces which act on the housing 2 can be particularly advantageously absorbed and distributed via the supporting structure 11.

If, for example, an external action of force which acts on the housing element 8 occurs, said action of force can be absorbed by the housing element 8 and can be transmitted to the supporting structure 11. Via the supporting structure 11, the action of force can be transmitted to the housing element 7, without an excessive action of force occurring on the ferrite element 5 and the secondary coil 4. In particular, the housing element 8 can be supported at least substantially directly on the housing element 7 via the supporting structure 11, with the result that components which are situated between the lower housing element 8 and the upper housing element 7 are protected. The supporting structure 11 is therefore an integrated supporting structure, by way of which, in particular, the ferrite element 5 can be protected effectively. At the same time, advantageous shielding and directing of the magnetic field can be ensured by way of the addition of the ferritic elements in the supporting structure 11.

Overall, it can be seen that the supporting structure 11 is a support structure consisting of non-conducting magnetically permeable fiber composite material. The housing elements 7 and 8 are, for example, housing structures which are connected to one another in a punctiform manner in the region of the ferrite regions 6 via the supporting structure 11. Forces can be distributed and dissipated particularly advantageously via the supporting structure 11. The ferritic elements have, in particular, magnetic properties, by means of which magnetic properties of the coil device 1 overall can be improved in the region of the through openings 10, in particular in comparison with a state, in which, for example, merely air is received in the through openings 10. Moreover, the housing 2 is covered by way of a further component 14 of the motor vehicle in the vehicle vertical direction toward the top at least partially, in particular at least predominantly or completely. The component 14 is, for example, part of said undertray, with the result that the component 14 is, for example, an undertray element of the undertray. In the case of the first embodiment which is illustrated in FIG. 1, the housing 2 is supported directly on the further component 14 in the vehicle vertical direction toward the top, with the result that, for example, the housing 2, in particular the housing element 7, makes contact with the further component 14.

Figure 2:
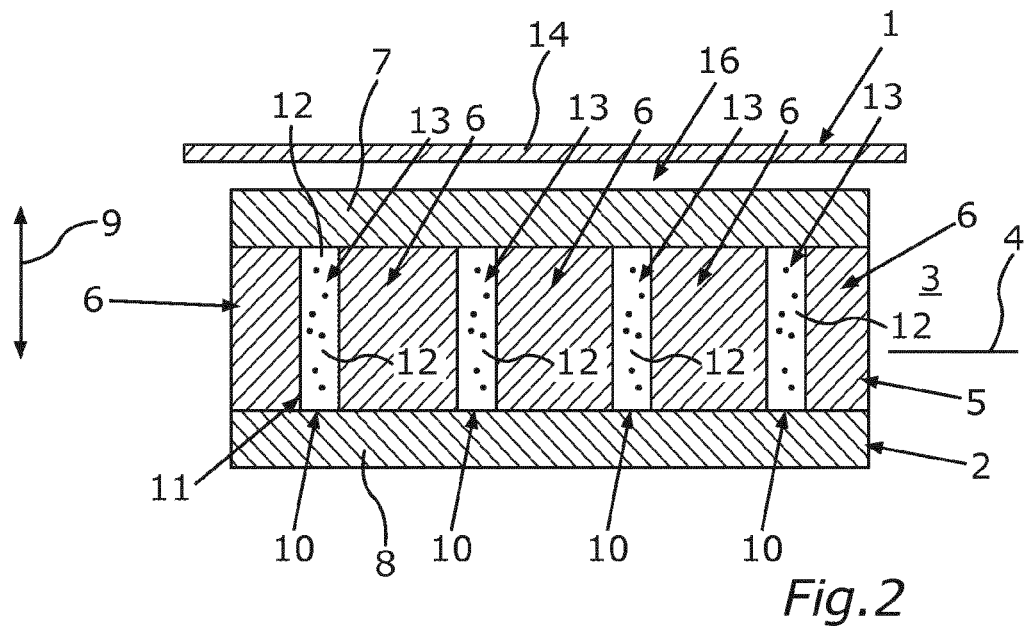
FIG. 2 shows details of a diagrammatic and sectioned side view of the coil device in accordance with a second embodiment.

FIG. 2 shows a second embodiment of the coil device 1. The second embodiment differs, in particular, from the first embodiment by virtue of the fact that the housing 2 is not supported directly on the further component 14 in the vehicle vertical direction toward the top, but rather an air gap 16 is provided in the vehicle vertical direction between the housing 2 and the further component 14. If, for example, a force acts on the housing 2 in the vehicle vertical direction from the bottom to the top, in particular via the housing element 8, the housing 2 with the components arranged therein is first of all, for example, moved upward in the vehicle vertical direction, in particular as a rigid body, and is therefore moved toward the component 14. As a consequence, the housing 2, in particular the housing element 7, comes into direct supporting contact with the component 14, with the result that the force which acts on the housing element 8 and is therefore introduced into the housing 2 via the housing element 8 is thereupon dissipated via the supporting structure 11 and the housing element 7 to the component 14. Here, the supporting structure 11 is utilized, in order to conduct the force which acts on the coil device 1 from the outside through the ferrite element 5.

Figure 3:
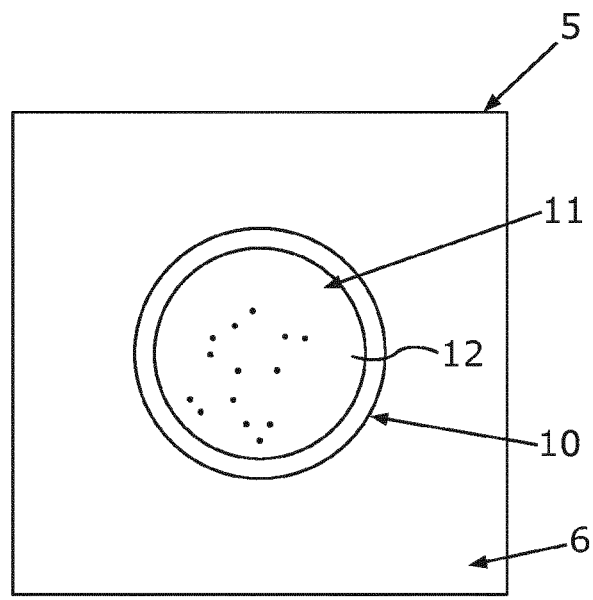
FIG. 3 shows details of a diagrammatic plan view of the coil device in accordance with a third embodiment.

FIG. 3 shows a third embodiment, in the case of which the ferrite regions 6 are configured in one piece with one another. The respective through opening 10 is therefore configured as a hole which penetrates the ferrite element 5 which is, for example, in one piece.

Figure 4:
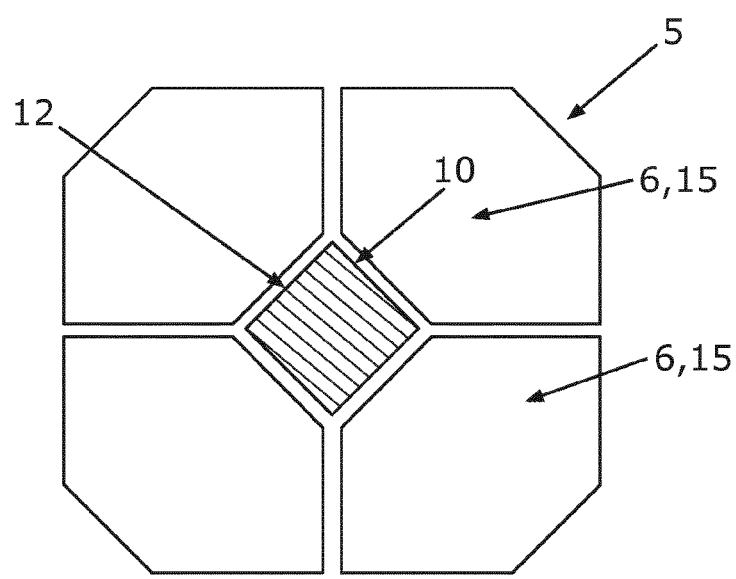
FIG. 4 shows details of a diagrammatic plan view of the coil device in accordance with a fourth embodiment.

Finally, FIG. 4 illustrates a fourth embodiment, in the case of which the ferrite regions 6 are configured as ferrite parts 15 which are configured separately from one another. The ferrite element 5 is therefore configured as a multiple-piece ferrite, the individual ferrite parts 15 being arranged in such a way that the supporting structure 11 can support the housing elements 7 and 8 on one another in the described way between the ferrite parts 15. Furthermore, different outer circumferential-side shapes of the supporting elements 12 are contemplated. The respective supporting element 12 can be, for example, of round, in particular circular, or else angular, in particular rectangular or square, configuration on the outer circumferential side or in cross section. By virtue of the fact that the ferritic elements are embedded into the fiber composite material, in particular its matrix, the supporting structure 11 has, for example, a mixture of magnetically permeable fiber composite material, in particular matrix, and ferritic elements, it being possible for said mixture to represent an optimization of the conducting or shielding of the magnetic field despite the presence of the through openings 10 between the ferrite regions 6, which through openings 10 are configured, for example, as gaps.

LIST OF DESIGNATIONS

1 Coil device
2 Housing
3 Receiving space
4 Secondary coil
5 Ferrite element
6 Ferrite region
7 Housing element
8 Housing element
9 Double arrow
10 Through opening
11 Supporting structure
12 Supporting element
13 Particle
14 Further component
15 Ferrite part
16 Air gap The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A coil device for a motor vehicle, comprising:
a housing having a receiving space, the housing having opposing first and second housing elements;
at least one secondary coil arranged in the receiving space for inductive transmission of electric energy for charging an energy store of the motor vehicle;
at least one ferrite element arranged in the housing for conducting at least one magnetic field for the inductive transmission of the electric energy, wherein
the ferrite element comprises at least two ferrite regions spaced apart from one another at least partially via at least one through opening arranged between the ferrite regions, and
the ferrite element further comprises a supporting structure at least partially arranged in the at least one through opening, the supporting structure being formed of a fiber composite material having ferritic elements in the fiber composite material, and
the opposing first and second housing elements of the housing are supported on one another via the supporting structure.

2. The coil device according to claim 1, wherein
the receiving space is delimited at least partially in a vehicle vertical direction toward a top by way of the first housing element and in the vehicle vertical direction toward a bottom by way of the second housing element.

3. The coil device according to claim 2, wherein
the housing is covered in the vehicle vertical direction toward the top at least partially by way of a further component of the motor vehicle.

4. The coil device according to claim 3, wherein
the housing is supported directly on the further component in the vehicle vertical direction toward the top.

5. The coil device according to claim 3, wherein
an air gap is provided in the vehicle vertical direction between the housing and the further component.

6. The coil device according to claim 1, wherein
the ferrite element comprising the at least two ferrite regions is configured in one piece.

7. The coil device according to claim 1, wherein
the ferrite regions are formed by way of ferrite parts of the ferrite element which are configured separately from one another.

8. The coil device according to claim 1, wherein
the respective ferritic elements are formed from powder which is embedded into the fiber composite material.

9. The coil device according to claim 1, wherein the respective ferritic elements have at least one foil.

10. The coil device according to claim 1, wherein at least one spring device is provided, via which the supporting structure is supported on at least one of the first and second housing elements.

* * * * *